United States Patent [19]
Suzuki et al.

[11] Patent Number: 5,830,300
[45] Date of Patent: Nov. 3, 1998

[54] METHOD OF ULTRASONIC WELDING FOR A RESIN CASE

[75] Inventors: Kazushi Suzuki; Takahiro Sone; Hiroshi Fujinami, all of Shizuoka, Japan

[73] Assignee: Star Micronics Co., Ltd., Shizuoka, Japan

[21] Appl. No.: 887,966

[22] Filed: Jul. 3, 1997

[30] Foreign Application Priority Data

Jul. 5, 1996 [JP] Japan .................................. 8-195704

[51] Int. Cl.⁶ .................................................. B32B 31/16
[52] U.S. Cl. ................. 156/73.1; 156/309.6; 156/580.2; 264/445
[58] Field of Search ........................ 156/69, 73.1, 308.2, 156/309.6, 580.1, 580.2; 264/442, 443, 445; 425/174.2

[56] References Cited

U.S. PATENT DOCUMENTS

| | | | |
|---|---|---|---|
| 3,376,179 | 4/1968 | Balamuth | 156/73.1 |
| 4,088,257 | 5/1978 | Devine | 156/73.1 X |
| 4,326,903 | 4/1982 | Summo | 156/73.1 |
| 4,554,034 | 11/1985 | Ensminger | 156/69 |
| 4,681,645 | 7/1987 | Fukushima et al. | 156/73.1 |
| 4,767,492 | 8/1988 | Fukusima et al. | 156/580.2 |
| 4,964,941 | 10/1990 | Von Brandt et al. | 156/360 |
| 4,975,133 | 12/1990 | Gochermann | 156/73.1 |
| 5,079,387 | 1/1992 | Weaver et al. | 264/445 X |
| 5,223,063 | 6/1993 | Yamazaki et al. | 156/73.2 |

FOREIGN PATENT DOCUMENTS

| | | | |
|---|---|---|---|
| 62-282914 | 12/1987 | Japan | B29C 65/08 |
| 5-54815 | 8/1993 | Japan | B29C 65/08 |
| 6-22907 | 3/1994 | Japan | B29C 65/08 |
| 6-91756 | 4/1994 | Japan | B29C 65/08 |
| 7-133372 | 5/1995 | Japan | C08K 3/22 |

*Primary Examiner*—James Sells
*Attorney, Agent, or Firm*—Sughrue, Mion, Zinn, Macpeak & Seas, PLLC

[57] ABSTRACT

A method of ultrasonic welding for a resin case in which an ultrasonic vibration is applied to the resin case in a direction parallel to the welding surface.

5 Claims, 7 Drawing Sheets

METHOD OF ULTRASONIC WELDING FOR A RESIN CASE

BACKGROUND OF THE INVENTION

1. Field of the Invention

The present invention relates to a method of ultrasonic welding for a resin case applied to welding and fixing of a lower case and an upper case constituting a resin case of, for example, an electromagnetic type of electroacoustic transducer, and, more particularly, to a method of ultrasonic welding for a resin case, which minimizes propagation of vibration during welding in order to prevent any improper state due to vibration.

2. Description of the Related Art

A structure of an electromagnetic type of electroacoustic transducer as an example of the prior art is illustrated in FIGS. 12 and 13. There is an upper case 201, and formed at the center of the left-hand end portion of the upper case 201 in FIG. 13 is a sound port 203. There is also a lower case 202 on the right of the upper case 201 in FIG. 13, and the lower case 202 and the upper case 201 are welded and fixed by ultrasonic welding. There is an opening 207 formed in the right-hand end portion of the lower case 202 in FIG. 13. A base 209 and a core 211 are integrally secured to the opening 207 as "a pole piece". A board 213 is also attached to the opening 207.

A coil 215 is wound around the core 211. Respective coil terminals 215a and 215b of the coil 215 are securely connected, by means of solder, for example, to lead terminals 217 and 219 attached to the board 213. A magnet 223 is placed around the coil 215 with an existence of a ring-like clearance 221 formed in between. Provided on the inner periphery of the aforementioned lower case 202 is a step portion 225 at which a diaphragm 226 is supported. The diaphragm 226 comprises an elastic plate 227 and a magnetic piece 229 which is attached as an added mass to the center portion of the elastic plate 227.

In the thus constituted electromagnetic type of electroacoustic transducer, the elastic plate 227 integrally provided with the magnetic piece 229, is set to have a given polarity by means of the magnet 223, and hence, is attracted to the magnet 223. When a current flows across the coil 215 via the lead terminals 217 and 219 under this situation, the core 211 is magnetized, generating a magnetic field at the distal end thereof. When the magnetic pole of the core 211 induced by the coil 215 is different from the magnetic pole induced by the magnet 223 attached to the elastic plate 227, the elastic plate 227 is attracted to the core 211. When the magnetic pole of the core 211 induced by the coil 215 is the same as the magnetic pole induced by the magnet 223 attached to the elastic plate 227, the elastic plate 227 repels the core 211. Consequently, by allowing the current to intermittently flow in either direction, the elastic plate 227 repeats the above-discussed operation. In other words, the elastic plate 227 vibrates at a given frequency, thus generating a sound.

There is also an electromagnetic type of electroacoustic transducer in another structure, as illustrated in FIG. 14, in which terminals are formed in a resin case by inserting. There is a read frame 301, which consists of a plurality of lead frame elements 301a in series, so that a plurality of electromagnetic type of electroacoustic transducers is manufactured by using the corresponding lead frame elements 301a. FIG. 14 illustrates one of these lead frame elements 301a, which is provided with a pair of outer-frame guide rails 303 and 303, and with four guide holes 304. Formed between the pair of outer-frame guide rail 303 and 303 is an opening 305. There are protrudent chips 307, 309, 311 and 313 in the space formed by the opening 305, and the protrudent chips 307, 309, 311 and 313 respectively have end portions 307a, 309a, 311a and 313a. The protrudent chips 307, 309, 311 and 313 are cut afterwards along the cut lines A shown in FIG. 14, thus the end portion 307a, 309a, 311a and 313a respectively serve as lead terminals 307a, 309a, 311a and 313a for the electromagnetic type of electroacoustic transducer as a finished product.

A base member 315 is formed on the lead frame 301 in the following method. There is an unillustrated molding frame in which the lead frame 301 is placed, and an unillustrated yoke (base) as well as the lead terminals 307a, 309a, 311a and 313a are formed by inserting (at that moment, the cuttings along the cut lines A shown in FIG. 14 have not been carried out). Then an unillustrated coil is wound around a pole. A support ring 323 is placed inside the base member 315, and an unillustrated magnet is placed inside the support ring 323. An elastic plate 329 provided with a magnetic piece 327 as an added mass is placed on the support ring 323. Then both coil terminals 329a and 329b are respectively led out to lands of the lead terminals 307a and 309a, and securely soldered to the lands.

For reference, the coil and the magnet, which are discussed above as unillustrated parts, are positioned under the elastic plate 329 in FIG. 14.

There is a case 331, formed separately, made of synthetic resin. Reference numeral 333 in FIG. 14 is a sound port. The case 331 is placed on the base member 315 of each lead frame element 301a, then the case 331 and the base member 315 are welded and fixed by ultrasonic welding. In the thus mentioned operation, a plurality of electromagnetic type of electroacoustic transducers are produced on the lead frame 301. Then the protrudent chips 307, 309, 311 and 313 of each lead frame element 301a are cut along the cut lines A, so that each electromagnetic type of electroacoustic transducer may become a separate product piece. Finally, forming of the lead terminals 307a, 309a, 311a and 313a of each electromagnetic type of electroacoustic transducer is carried out, and hence, the electromagnetic type of electroacoustic transducer as a finished product is obtained.

As above described, in the case of electromagnetic type of electroacoustic transducer as illustrated in FIGS. 12 and 13, the lower case 202 and the upper case 201 are welded and fixed by ultrasonic welding. Further in the case of electromagnetic type of electroacoustic transducer as illustrated in FIG. 14, the base member 315 and the case 331 are welded and fixed also by ultrasonic welding.

The method of ultrasonic welding will now be described in detail. The ultrasonic electric energy which is output from an ultrasonic welding apparatus is converted to the mechanical vibration energy via a horn, and such a mechanical vibration energy is applied to an object material to be welded, for example, to the upper case 201 in FIGS. 12 and 13, or to the case 331 in FIG. 14. The applied vibration is propagated to the confronting material, namely, to the lower case 202 in FIGS. 12 and 13, or to the base member 315 in FIG. 14. When a pressure is applied to these materials at the same time of application of such a vibration, the transmission of ultrasonic vibration concentrates at an unillustrated energy director provided at the welding portion between, for example, the upper case 201 and the lower case 202, thus the frictional heat is locally generated at the welding portion. Consequently, the upper case 201 and the lower case 202 are welded and fixed, or the case 331 and the base member 315 are welded and fixed.

With regard to the prior art of the ultrasonic welding, the ultrasonic vibration has been applied, as "longitudinal vibration", to the upper case 201 in FIGS. 12 and 13, or to the case 331 in FIG. 14. It is because, in the case of longitudinal vibration, the ultrasonic vibration is effectively transmitted to the energy director at the welding portion, therefore the welding can be carried out rather in a low energy as well as in a short time.

However, the prior art of ultrasonic welding to which the longitudinal vibration is applied, has the following problems.

For example, in the case of electromagnetic type of electroacoustic transducer as illustrated in FIGS. 12 and 13, the longitudinal vibration is applied to the upper case 201. Thus the upper case 201 vibrates in the longitudinal direction, and the welding portion of the upper case 201 and that of the lower case 202 collide with each other. Consequently, the longitudinal vibration applied to the upper case 201 is propagated to the energy director, and eventually to the lower case 202. At that time, since there is the coil 215 mounted inside the lower case 202, the propagated vibration may affect the coil 215, which possibly results in being cut of the coil terminals 215a and 215b. Namely, the coil terminals 215a and 215b of the coil 215 are respectively in connection with the lead terminals 217 and 219 by means of being soldered, and in such a state, when the vibration is propagated to these soldered parts, the vibration cuts the soldered connections between the coil terminal 215a and the lead terminal 217, and between the coil terminal 215b and the lead terminal 219. When these connections are cut, as a matter of course, the electromagnetic type of electroacoustic transducer loses its function.

Recently, there are increasing requirements of electromagnetic type of electroacoustic transducer of which size and thickness are minimized. When the size and the thickness thereof are minimized, the distances as set forth below become shorter; from the sound port 203 as illustrated in FIG. 13 to the welding portion positioned between the upper case 201 and the lower case 202; and from the sound port 203 in FIG. 13 to the coil terminals 215a and 215b of the coil 215. Namely, the above minimization shortens the distance from the horn, which is the generating source of ultrasonic vibration, to the welding portion between the upper case 201 and the lower case 202, and to the coil terminals 215a and 215b. In addition, the above minimization thins the wire of the coil 215. Therefore the possibility of being cut of the soldered coil terminals 215a and 215b, or of the wire of the coil 215, due to longitudinal vibration, becomes higher, which eventually stands as the serious obstacle to minimization in size and thickness of the electromagnetic type of electroacoustic transducer.

The same is true to the case of electromagnetic type of electroacoustic transducer as illustrated in FIG. 14, which is suitable for minimization in size and thickness thereof. The electromagnetic type of electroacoustic transducer in FIG. 14 has a possibility that the coil terminals 329a and 329b are cut due to vibration.

When the base member 315 vibrates, namely when the coil terminals 329a and 329b vibrate, the terminals of the lead frame element 301a (namely, the lead terminals 307a and 309a) simultaneously vibrate. The base member 315 and the lead terminals 307a and 309a are in the shape of flat and thin plates, and since the longitudinal vibration is applied to the base member 315 and to the lead terminals 307a and 309a in the direction of thickness of their plates, the vibration especially and seriously affects these base member 315 and the lead terminals 307a and 309a. The coil terminals 329a and 329b, and the lead terminals 307a and 309a, respectively have different modes (frequencies) of vibration proper to them due to difference of mass, and in this case, the force of vibration concentrates at the thinner part, namely at the coil terminals 329a and 329b. Consequently, the coil terminals 329a and 329b are cut.

SUMMARY OF THE INVENTION

It is an object of the present invention to provide a method of ultrasonic welding for a resin case, in which, when the structural members of the resin case are welded and fixed by ultrasonic welding, the propagation of vibration to these structural members as well as to their relating parts is minimized, so that any improper state due to such a vibration is removed in order to maintain the good condition of the product.

To achieve the object mentioned above, according to the present invention, there is provided a method of ultrasonic welding for a resin case comprising a step of applying an ultrasonic vibration to the resin case in a direction parallel to a welding surface.

With this arrangement, instead of the longitudinal vibration which has been applied to the structural members for welding and fixing according to the ultrasonic welding in the prior art, the lateral vibration is applied to the structural members for welding and fixing, which lessens the effect of vibration to the structural members and to their relating parts.

Preferably, the resin case may be that used for an electromagnetic type of electroacoustic transducer having a coil therein.

Preferably, in the case of welding surface of the resin case in a polygonal shape, a step of applying an ultrasonic vibration may be in an oblique direction to each side of the polygonal shape of the welding surface.

As an example of the polygonal shape of the welding surface of the resin case, in the case of a quadrilateral shape, a step of applying an ultrasonic vibration may be in an oblique direction at an angle of 45° to an arbitrary side of the quadrilateral shape of the welding surface.

Further, as another example of the polygonal shape of the welding surface of the resin case, in the case of a rectangular shape, a step of applying an ultrasonic vibration may be in an oblique direction at an angle of 45° to an arbitrary side of the rectangular shape of the welding surface.

Preferably, in the case of welding surface of the resin case in a round shape, a step of applying an ultrasonic vibration may be in a circumferential direction to the round shape of the welding surface.

With this arrangement, since the ultrasonic welding applies the lateral vibration instead of the longitudinal vibration which has been applied in the prior art, the propagation of vibration to the structural members and to their relating parts is remarkably reduced, eventually these parts are protected against damages.

When the lateral vibration for ultrasonic welding is applied to the resin case of the electromagnetic type of electroacoustic transducer having a coil therein, the vibration propagated to the coil terminals are remarkably reduced, thus the coil terminals are protected from being cut.

In the case of welding surface in a polygonal shape, when the lateral vibration is applied in the oblique direction to each side of the welding surface, the equal amount of generation of frictional heat can be obtained at each side, thus the welding and fixing are surely carried out. Especially in the case of welding surface in a quadrilateral or a rectangular shape, the effective angle of the lateral vibration applied in the oblique direction may be at 45° to an arbitrary side.

Further, in the case of welding surface in a round shape, when the lateral vibration is applied in the circumferential direction to the side of the welding surface, the generation of frictional heat can be equally obtained all over the welding surface, thus the welding and fixing are surely carried out.

BRIEF DESCRIPTION OF THE DRAWINGS

The invention will be described below in detail with reference to the accompanying drawings, in which.

DETAILED DESCRIPTION OF THE INVENTION

First Embodiment

Figure 1:
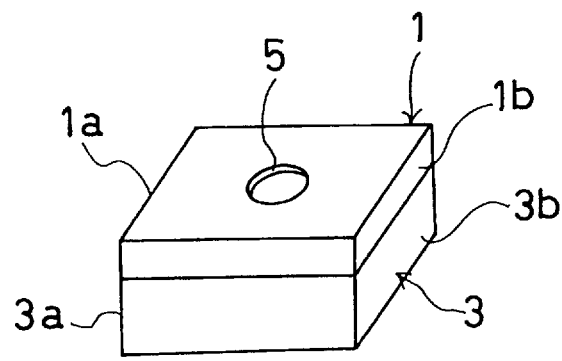
FIG. 1 is a perspective view of an electromagnetic type of electroacoustic transducer according to a first embodiment of the present invention.

A first embodiment of the present invention will now be described with reference to FIGS. 1 through 4. FIG. 1 illustrates an appearance of an electromagnetic type of electroacoustic transducer to which a method of ultrasonic welding according to the present embodiment is applied. There are an upper case 1 and a lower case 3, and formed at the center of the upper case 1 is a sound port 5. The internal structures of the upper case 1 and the lower case 2 are the same as those of the prior art. The upper case 1 and the lower case 3 are welded and fixed by ultrasonic welding, but a method of ultrasonic welding according to the present embodiment is not that according to the prior art. The ultrasonic welding in the prior art applies the longitudinal vibration to the materials to be welded, but the ultrasonic welding according to the present embodiment applies "lateral vibration" to a welding surface 7, in the direction parallel to the welding surface 7. Arrow A in FIG. 2 indicates such a lateral direction.

The longitudinal vibration in the prior art causes collision of welded materials with each other, namely collision of the upper case 1 with the lower case 3. Instead, the lateral vibration in the present embodiment causes rubbing against each other in the parallel direction, which remarkably lessens the propagation of vibration to the lower case 3. Consequently, the lateral vibration minimizes the possibility of being cut of coil terminals inside the lower case 3.

Figure 2:
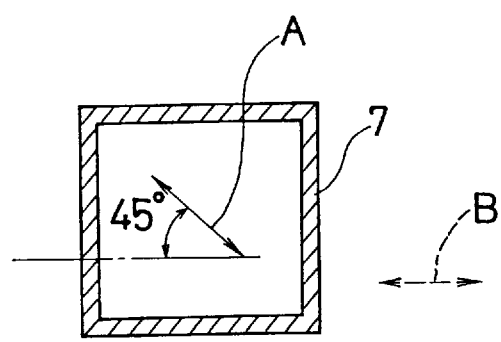
FIG. 2 is a plan view according to the first embodiment of the present invention in which lateral vibration is applied at the angle of 45° to a welding surface between an upper case and a lower case.
Figure 3:
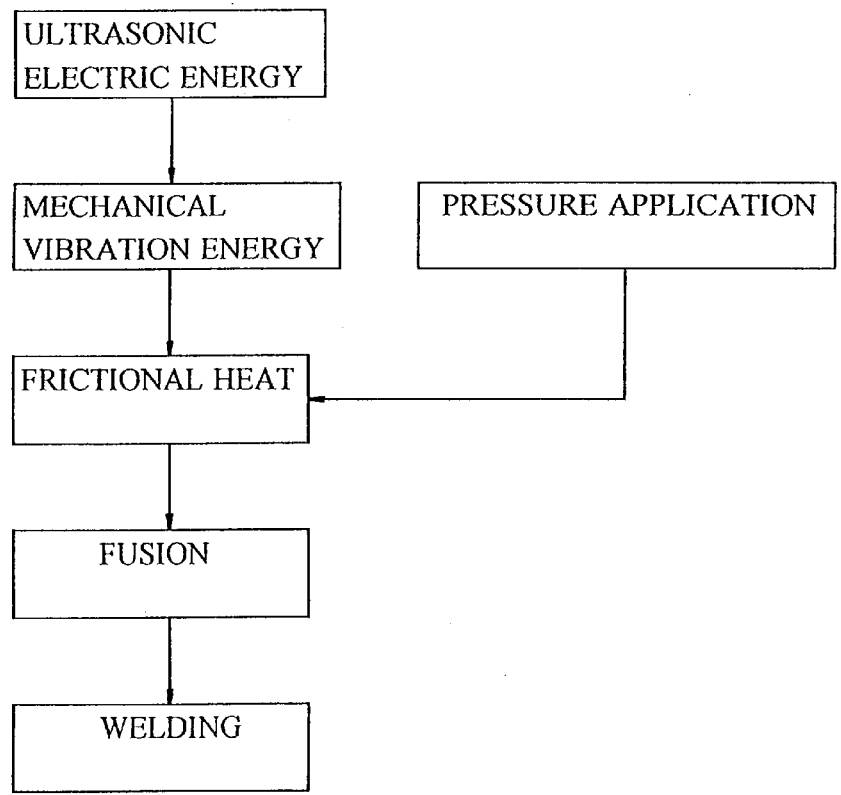
FIG. 3 is a block diagram according to the first embodiment of the present invention showing a process of ultrasonic welding.
Figure 4:
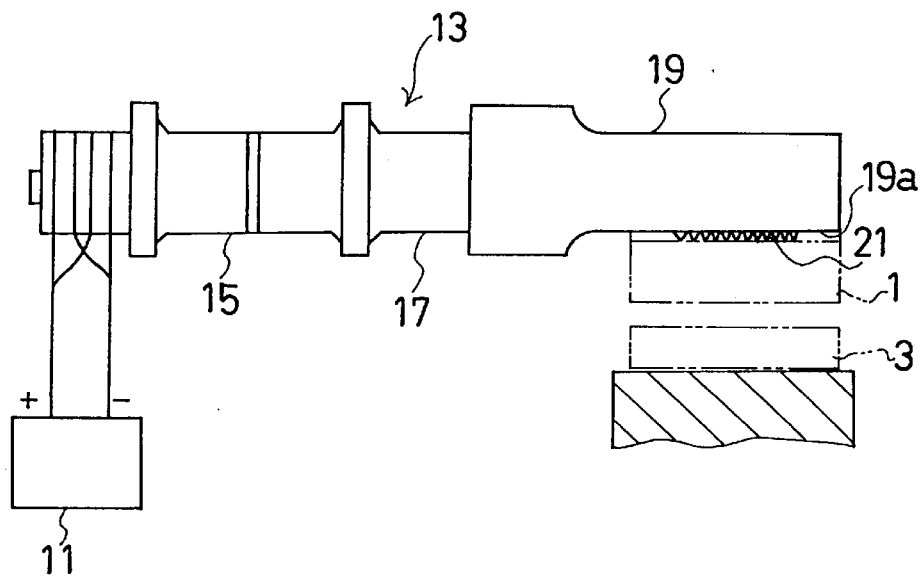
FIG. 4 is a schematic view according to the first embodiment of the present invention showing a mechanical structure of ultrasonic welding.
Figure 5:
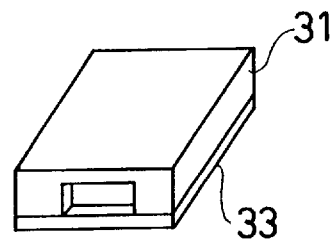
FIG. 5 is a perspective view of an electromagnetic type of electroacoustic transducer according to a second embodiment of the present invention.

The process and the mechanical structure with regard to the method of ultrasonic welding based on the "lateral vibration" are as illustrated in FIGS. 3 and 4. Firstly, the ultrasonic electric energy is transmitted (propagated) from an ultrasonic transmitter 11. The transmitted ultrasonic energy is then converted to the mechanical vibration energy by means of a treatment apparatus 13. The treatment apparatus 13 consists of, for example, a converter 15, a booster 17 and a horn 19. There is a plurality of protrusions 21 formed on a pressing surface 19a of the horn 19. The pressing surface 19a applies pressure to the upper case 1 via the protrusions 21. The mechanical vibration energy as above described is applied to the upper case 1 and to the lower case 3 as illustrated in FIG. 4, as the lateral vibration in the direction parallel to the welding surface 7 (see FIG. 2). The pressure is applied thereto at the same time. The applications of the lateral vibration and the pressure cause the frictional heat at the welding surface 7 between the upper case 1 and the lower case 3, and such a frictional heat causes fusion of an unillustrated energy director positioned at the welding surface 7 between the upper case 1 and the lower case 3, thus the welding and fixing of the upper case 1 and the lower case 3 are carried out.

The present embodiment defines the angle of applying lateral vibration as 45° as indicated by arrow A in FIG. 2. The angle of 45° is defined according to the following ground. When the lateral vibration is applied in the direction parallel to the horizontal direction in FIG. 2 (namely, in the direction as indicated by arrow B in FIG. 2), such a lateral vibration causes the large amount of resistant force at side walls 1a and 1b of the upper case 1, and at side walls 3a and 3b of the lower case 3, since the lateral vibration in the direction of arrow B corresponds to the vibration in the direction perpendicular to the surfaces of the side walls 1a, 1b, 3a and 3b. Thus the side walls 1a, 1b, 3a and 3b are bent, which may result in insufficient generation of frictional heat at such side walls, eventually the desired welding cannot be carried out. When the thickness of the plates of the upper case 1 and the lower case 3, which are made of resin, becomes thinner, the possibility of occurrence of these bending and insufficient frictional heat increases. To the contrary, when the lateral vibration at the angle of 45° as indicated by arrow A in FIG. 2 is applied to the upper case 1 and the lower case 3, there is a reduction of force applied to the side walls 1a, 1b, 3a and 3b, thus the side walls 1a, 1b, 3a and 3b are prevented from being bent. Consequently, the sufficient frictional heat can be equally generated all over the welding surface 7.

The present embodiment has the following advantages.

Firstly, apart from the ultrasonic welding in the prior art based on the longitudinal vibration, the ultrasonic welding in the present embodiment based on the lateral vibration remarkably lessens the vibration propagated to the coil terminals inside the lower case 3. Consequently, the lateral vibration minimizes the possibility of being cut of the coil terminals, and protects the electromagnetic type of electroacoustic transducer against being lost of its function.

And secondly, in accordance with the quadrilateral shape of the welding surface 7 between the upper case 1 and the lower case 3, the angle of application of the lateral vibration is defined as 45°, therefore the side walls 1a, 1b, 3a and 3b are prevented from being bent. Thus the sufficient frictional heat can be equally generated at each of four sides of the welding surface 7, and the welding and fixing of the upper case 1 and the lower case 3 are surely carried out. Consequently, it is possible to use the thinner coil wire, or to minimize and the size and thickness of the resin case. Therefore the method of ultrasonic welding according to the present embodiment eventually contributes to the minimization of size and thickness of the electromagnetic type of electroacoustic transducer.

Second Embodiment

Figure 6:
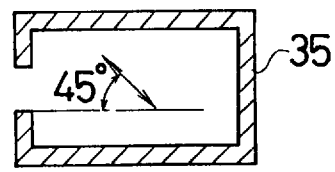
FIG. 6 is a plan view according to the second embodiment of the present invention in which lateral vibration is applied at the angle of 45° to a welding portion between an upper case and a lower case.

A second embodiment of the present invention will be described with reference to FIGS. 5 through 9. There is a welding surface 35 between a case 31 and a base member 33 in an oblong, rectangular shape in the second embodiment, which is basically the same structure as that of the first embodiment. Therefore the lateral vibration is similarly applied to the case 31 and the base member 33, in the direction parallel to the welding surface 35, at the angle of 45° as illustrated in FIG. 6.

Figure 7:
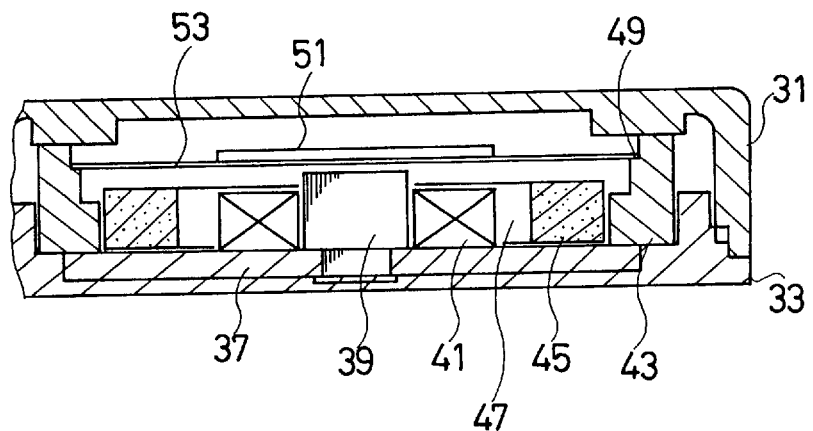
FIG. 7 is a partial cross-sectional view of an electromagnetic type of electroacoustic transducer according to the second embodiment of the present invention.

FIG. 7 illustrates the structure inside the case 31 and the base member 33. There is a base 37 and a core 39 which are integrally formed as a "pole piece" on the base member 33 inside the case 31. A coil 41 is wound around the core 39, and a support ring 43 is placed around the coil 41. Placed at the inner periphery of the support ring 43 (namely, at the space between the support ring 43 and the coil 41, with a clearance 47 on the side of the coil 41) is a magnet 45. An elastic plate 53 provided with a magnetic piece 51 as an added mass is placed on a step portion 49 of the support ring 43.

Figure 14:
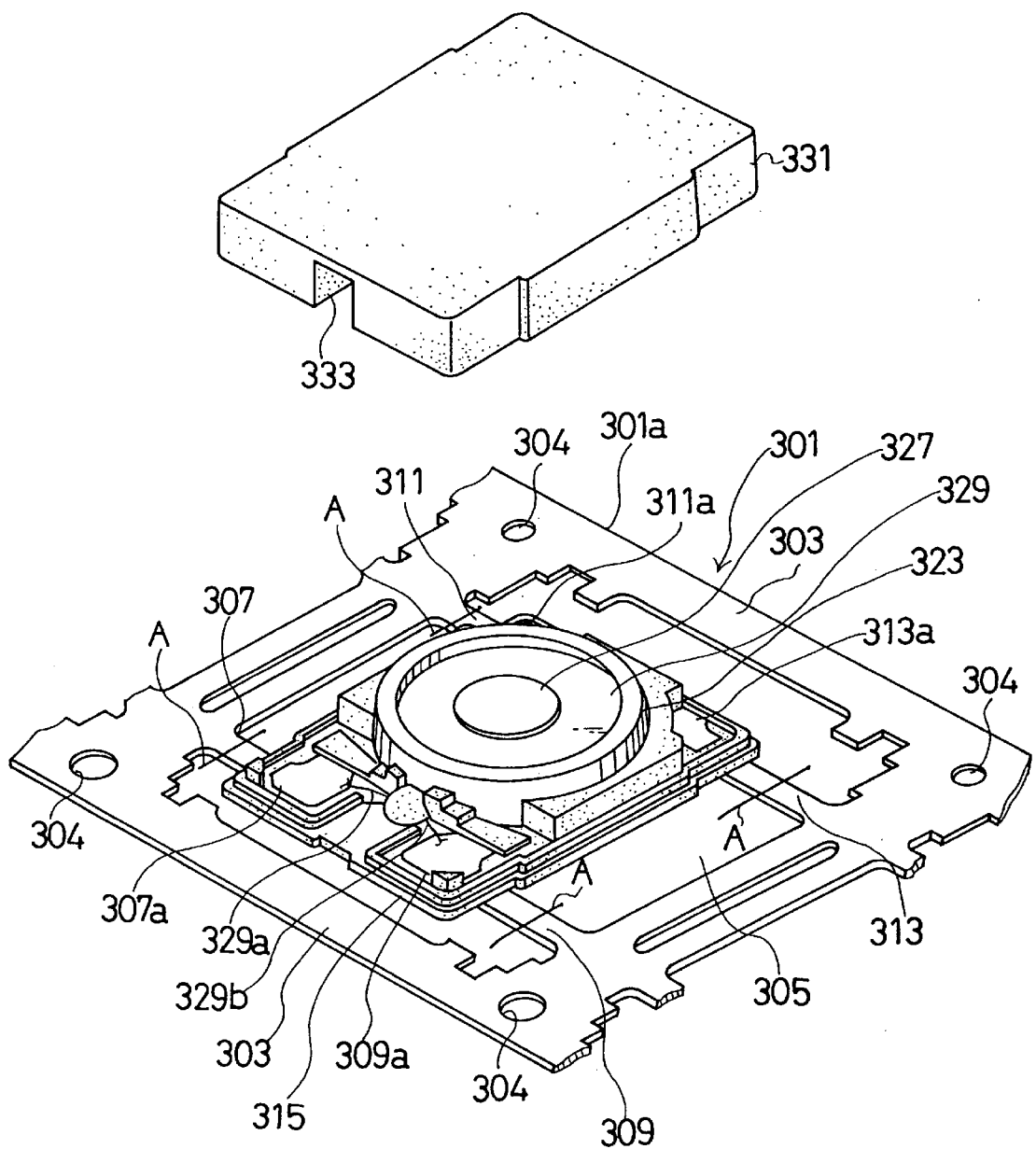
FIG. 14 is an exploded perspective view of an electromagnetic type of electroacoustic transducer according a prior art.

The electromagnetic type of electroacoustic transducer illustrated in FIG. 7 has the same structure as that of the electromagnetic type of electroacoustic transducer of the prior art illustrated in FIG. 14.

Figure 8:
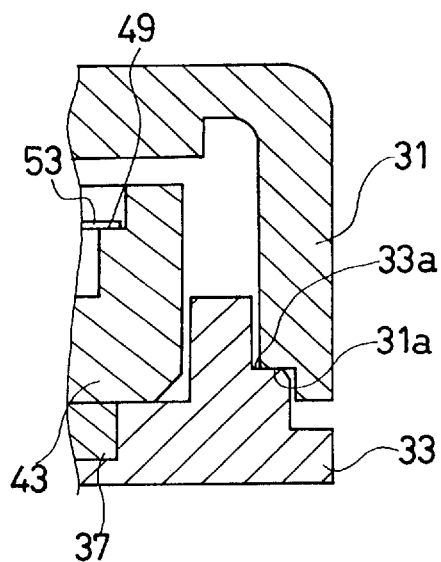
FIG. 8 is a partial cross-sectional view showing a state around a welding surface between a case and a base member before welding according to the second embodiment of the present invention is carried out.
Figure 9:
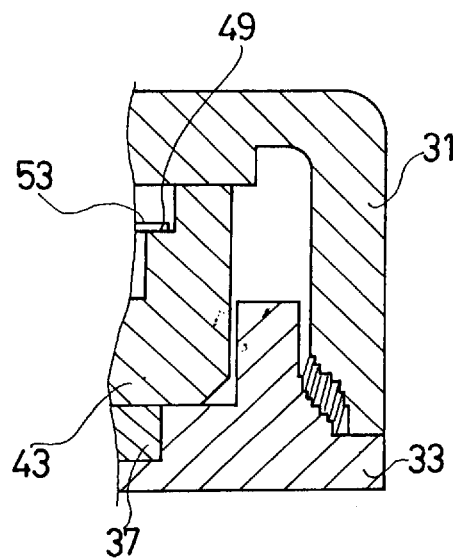
FIG. 9 is a partial cross-sectional view showing a state around a welding surface between a case and a base member after welding according to the second embodiment of the present invention is carried out.

The structure around the welding surface 35 between the case 31 and the base member 33, which are welded and fixed by ultrasonic welding based on the lateral vibration, is illustrated in FIG. 8. The case 31 has a step portion 31a, and the base member 33 also has a step portion 33a. FIG. 8 illustrates the state before the ultrasonic welding based on the lateral vibration is carried out, in which the both step portions 31a and 33a are confronting and in contact with each other. When the ultrasonic welding based on the lateral direction, which is the same method as that of the first embodiment, is applied to the case 31 and to the base member 33 in such a state, parts of the step portions 31a and 33a fuse due to frictional heat, thus the case 31 and the base member 33 are welded and fixed.

In the second embodiment, the same effect as discussed in the first embodiment is obtained.

Third Embodiment

A third embodiment of the present invention will now be described with reference to FIGS. 10 and 11. A welding surface 65 between an upper case 61 and a lower case 63 has a round (circular or ring-like) shape in the third embodiment. The lateral vibration is then rotatively applied to the upper case 61 and to the lower case 63 in the direction parallel to the welding surface 65, namely, in the rotative (circumferential) direction of the welding surface 65, as indicated by arrow C in FIG. 11.

The third embodiment applies the lateral vibration in the circumferential direction according to the following ground. When the lateral vibration applied in the direction parallel to the welding surface 65 is the reciprocating movement in a predetermined direction, although such a reciprocating movement is effective to the cases of the first and the second embodiments, the reciprocating movement causes the large amount of resistant force at a side wall of the upper case 61, thus the side wall of the upper case 61 is bent, which may result in insufficient generation of frictional heat the side wall, eventually the desired welding cannot be carried out. To the contrary, when the lateral vibration in the rotative direction (in the circumferential direction) as indicated by arrow C in FIG. 11 is applied to the upper case 61, there is a reduction of force applied to the side wall of the upper case 61, thus the side wall of the upper case 61 is prevented from being bent. Consequently, the sufficient frictional heat can be equally generated all over the welding surface 65, and the sufficient welding state is obtained all over the round shape of the welding surface 65.

Figure 10:
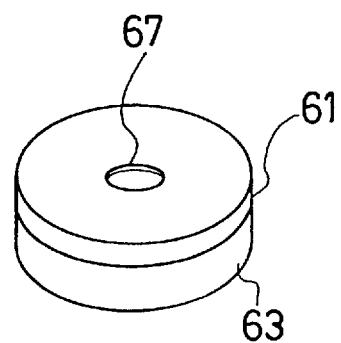
FIG. 10 is a perspective view of an electromagnetic type of electroacoustic transducer according to a third embodiment of the present invention.
Figure 11:
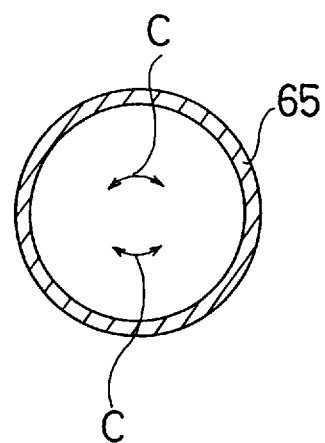
FIG. 11 is a plan view according to the third embodiment of the present invention in which lateral vibration is applied in the rotative direction to a welding surface between an upper case arid a lower case.
Figure 12:
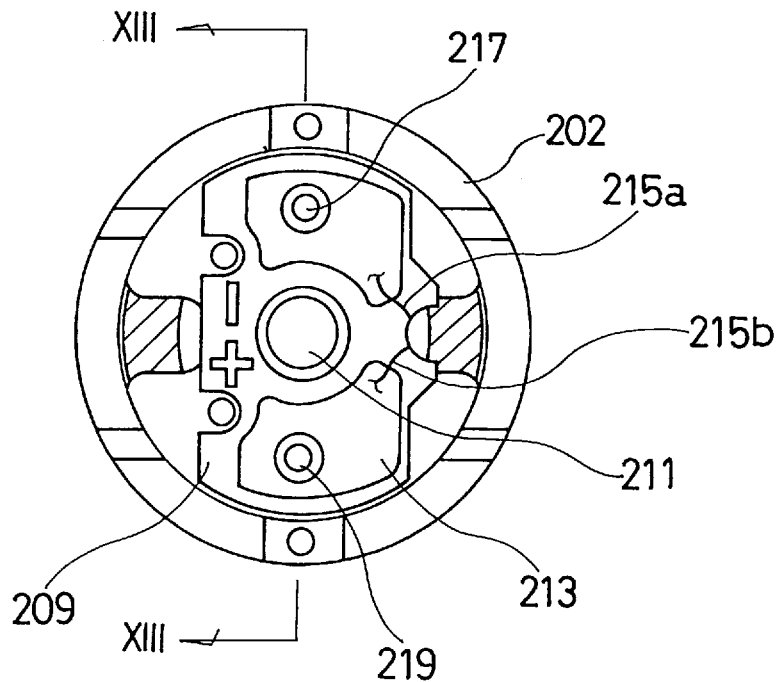
FIG. 12 is a plan view of an electromagnetic type of electroacoustic transducer according to a prior art as viewed from the bottom side.
Figure 13:
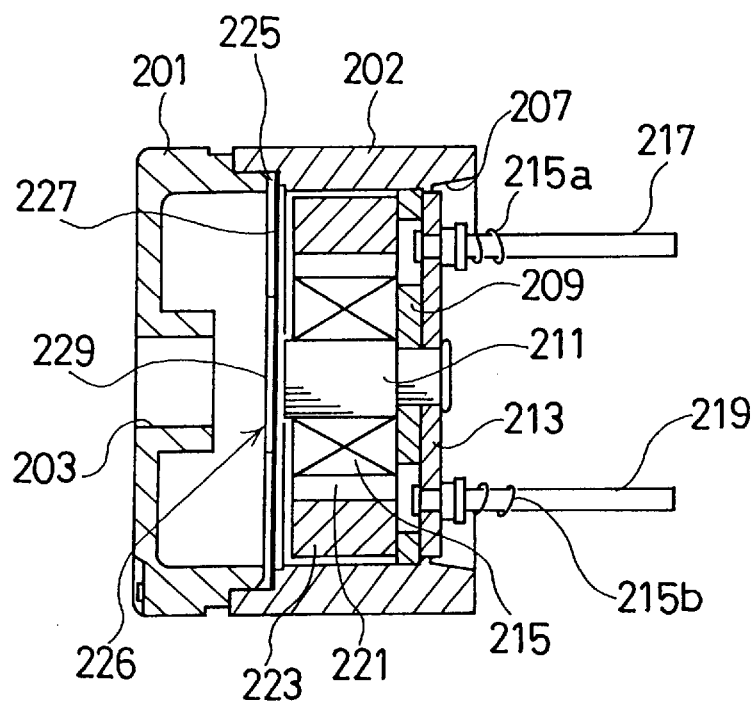
FIG. 13 is a cross-sectional view of the prior art taken along the line XIII—XIII in FIG. 12.

Reference numeral 67 in FIG. 10 is a sound port. In addition, the process and the mechanical structure with regard to the method of ultrasonic welding based on the lateral vibration according to the third embodiment is the same as those of the first and the second embodiments as above described. However, since there is a necessity of application of the lateral vibration in the circumferential direction in the third embodiment, any structure that converts the reciprocating movement in the lateral direction to the rotative movement in the lateral direction, should be added to the treatment apparatus 13 in FIG. 4.

The present invention is not limited to the first through third embodiments as described above.

Although each (embodiment refers to the resin case used for the electromagnetic type of electroacoustic transducer as the example of the resin case, the present invention can be applied to any other resin cases.

Any process and mechanical structure in order to generate and apply the ultrasonic vibration that are know per se can be used for the present invention.

In addition, the shapes of the resin cases in the above embodiments are merely examples of the present invention.

What is claimed is:

1. A method of ultrasonic welding, comprising the steps of:

providing a resin case used for an electroacoustic transducer having a coil therein, and applying ultrasonic vibration to said resin case in a direction parallel to a welding surface of said resin case, thereby minimizing the propagation of vibration to said coil during a welding process of said resin case.

2. The method of ultrasonic welding for a resin case as claimed in claim 1, wherein said welding surface of said resin case has a polygonal shape, and wherein said step of applying ultrasonic vibrations is applied in an oblique direction with respect to each side of said welding surface having a polygonal shape.

3. The method of ultrasonic welding for a resin case as claimed in claim 2, wherein said welding surface of said resin case has a quadrilateral shape, and wherein said step of applying ultrasonic vibrations is applied in an oblique direction at an angle of 45° with respect to an arbitrary side of said welding surface having a quadrilateral shape.

4. The method of ultrasonic welding for a resin case as claimed in claim 2, wherein said welding surface of said resin case has a rectangular shape, and wherein said step of applying ultrasonic vibrations is applied in an oblique direction at an angle of 45° with respect to an arbitrary side of said welding surface having a rectangular shape.

5. The method of ultrasonic welding for a resin case as claimed in claim 1, wherein said welding surface of said resin case has a round shape, and wherein said step of applying ultrasonic vibrations is applied in a circumferential direction to said said welding surface having a round shape.

* * * * *